United States Patent Office.

C. E. RICHARDSON, OF CAMBRIDGE, MASSACHUSETTS.

Letters Patent No. 74,247, dated February 11, 1868.

IMPROVEMENT IN PRESERVING AND PACKING MEAT.

*The Schedule referred to in these Letters Patent and making part of the same.*

TO ALL WHOM IT MAY CONCERN:

Be it known that I, C. E. RICHARDSON, of Cambridge, in the county of Middlesex, and State of Massachusetts, have discovered a new and improved Process of Preserving Animal Matter during warm seasons of the year; and I do hereby declare that the following is a full, clear, and exact description of the method of conducting this process.

My object is to overcome an objection which has hitherto proved practically fatal to the pickling and preservation of beef, pork, and other meats, during seasons of the year when the temperature is very high, and to render the process of preserving meats in brine as safe and certain of success during the summer months as during winter.

It is the opinion of experienced meat-packers that meat cannot be deprived of its latent animal heat in warm weather, and that for this reason it cannot be pickled and preserved sweet during such weather. Whatever may be the cause, it is a well-known fact that, notwithstanding the greatest care may be observed in treating meat under high temperatures, it is almost sure to spoil in the brine, and it is for this reason that the work is only performed during the cold months of winter.

My process consists in subjecting meat to a suitable freezing-mixture a sufficient length of time to allow the meat to become solidly frozen throughout, in which condition it is well known that animal matter cannot putrefy. The meat may be conveniently frozen by introducing it into a thin metallic vessel, and then surrounding this vessel with a mixture of ice and salt. Great care should be observed to freeze the meat solid throughout, for unless this is done, that portion of the meat which is not frozen will in almost if not every instance be found tainted in the pickle. The frozen meat is taken from the freezer and immediately introduced into the brine, which may be prepared in the usual well-known manner. After standing for several days in the brine, the meat is then finally packed for the market.

The stage at which meat spoils, in the process of preserving it, is generally while it is in the first pickle, or before the salt can strike through and thoroughly permeate it. If the meat can be preserved perfectly sweet throughout until the salt can strike through it, then the process will be successful. This I do by keeping the meat frozen, and allowing it to thaw in the brine only so fast as the salt permeates it.

I am aware that several attempts have been made to preserve meat during warm weather, by subjecting the meat to low degrees of temperature, but above the freezing-point, with a view to destroy the animal heat in it, and that the process of salting has been conducted in artificially-cooled apartments; also that very cold brine has been used; also that meat has been partially cooked before putting it into brine; but such processes are objectionable, and are found to be of no practical value.

During the winter season, when meat can be successfully preserved without first treating it as I have described, and when such treatment is not desirable, it is possible that meat which had been exposed to extreme cold weather, and thereby became frozen, has been put into brine in a frozen state, but, as I believe, not with the knowledge that, by an artificial process of freezing the meat solidly throughout, it might be successfully preserved at the high temperatures, and under other conditions of the air, during summer months.

What I claim as new, and desire to secure by Letters Patent, is—

The within-described process of preserving animal matter, under high temperatures, from putrefaction.

C. E. RICHARDSON.

Witnesses:
I. B. TARR,
EDM. F. BROWN.